(12) United States Patent
Olson

(10) Patent No.: US 9,007,310 B1
(45) Date of Patent: Apr. 14, 2015

(54) SINGLE LAYER TOUCH SENSOR WITH IMPROVED SENSITIVITY AND ACCURACY

(75) Inventor: Dana Olson, Kirkland, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1678 days.

(21) Appl. No.: 12/072,935

(22) Filed: Feb. 29, 2008

(51) Int. Cl.
*G06F 3/041* (2006.01)

(52) U.S. Cl.
CPC ........................................ *G06F 3/041* (2013.01)

(58) Field of Classification Search
CPC ....... G06F 3/041; G06F 3/0412; G06F 3/044; G06F 3/045
USPC ...................... 345/173–179; 178/18.05–18.06
See application file for complete search history.

(56) References Cited

U.S. PATENT DOCUMENTS

| | | | | |
|---|---|---|---|---|
| 4,476,463 | A * | 10/1984 | Ng et al. | 345/174 |
| 4,680,430 | A * | 7/1987 | Yoshikawa et al. | 345/174 |
| 5,008,497 | A * | 4/1991 | Asher | 178/18.05 |
| 6,177,918 | B1 * | 1/2001 | Colgan et al. | 345/173 |
| 6,239,790 | B1 * | 5/2001 | Martinelli et al. | 345/174 |
| 6,278,444 | B1 * | 8/2001 | Wilson et al. | 345/173 |
| 6,535,200 | B2 * | 3/2003 | Philipp | 345/168 |
| 7,598,752 | B2 * | 10/2009 | Li | 324/657 |
| 7,800,589 | B2 * | 9/2010 | Hurst et al. | 345/173 |
| 8,624,870 | B2 * | 1/2014 | Joharapurkar et al. | 345/174 |
| 8,803,838 | B2 * | 8/2014 | Haga et al. | 345/173 |
| 8,860,684 | B1 * | 10/2014 | Gandhi et al. | 345/174 |
| 2002/0190964 | A1 * | 12/2002 | Van Berkel | 345/173 |
| 2003/0197688 | A1 * | 10/2003 | Aufderheide et al. | 345/173 |
| 2005/0035953 | A1 * | 2/2005 | Woolley et al. | 345/173 |
| 2005/0162411 | A1 * | 7/2005 | Berkel van | 345/179 |
| 2006/0139340 | A1 * | 6/2006 | Geaghan | 345/177 |
| 2006/0202969 | A1 * | 9/2006 | Hauck | 345/173 |
| 2006/0227114 | A1 * | 10/2006 | Geaghan et al. | 345/173 |
| 2006/0267953 | A1 * | 11/2006 | Peterson et al. | 345/173 |
| 2006/0290677 | A1 * | 12/2006 | Lyon et al. | 345/173 |
| 2007/0291011 | A1 * | 12/2007 | Chang | 345/173 |
| 2007/0296709 | A1 * | 12/2007 | GuangHai | 345/173 |
| 2008/0006453 | A1 * | 1/2008 | Hotelling | 178/18.06 |
| 2008/0018608 | A1 * | 1/2008 | Serban et al. | 345/173 |
| 2008/0111714 | A1 * | 5/2008 | Kremin | 341/33 |
| 2008/0136787 | A1 * | 6/2008 | Yeh et al. | 345/173 |
| 2008/0142352 | A1 * | 6/2008 | Wright | 200/600 |
| 2008/0150905 | A1 * | 6/2008 | Grivna et al. | 345/173 |
| 2008/0150906 | A1 * | 6/2008 | Grivna | 345/173 |
| 2009/0058818 | A1 * | 3/2009 | Chang et al. | 345/173 |
| 2009/0066669 | A1 * | 3/2009 | Olson | 345/174 |
| 2009/0091551 | A1 * | 4/2009 | Hotelling et al. | 345/174 |
| 2009/0127003 | A1 * | 5/2009 | Geaghan | 178/18.03 |
| 2009/0163256 | A1 * | 6/2009 | Wienke | 455/575.3 |
| 2010/0090975 | A1 * | 4/2010 | Nagata et al. | 345/174 |
| 2010/0259503 | A1 * | 10/2010 | Yanase et al. | 345/174 |
| 2014/0285444 | A1 * | 9/2014 | Hermes et al. | 345/173 |

* cited by examiner

*Primary Examiner* — Alexander Eisen
*Assistant Examiner* — Nelson Lam

(57) ABSTRACT

Touch sensor methods, devices and systems are disclosed. One embodiment of the present invention pertains to a touch sensing system comprising a sensing device for sensing one or more touches on a sensor surface made of multiple conductive strips in one direction and a dual processing device for determining a horizontal position and a vertical position of each touch by processing currents generated in response to the touch, where the currents charge and discharge a capacitor formed between the touch and the sensor surface.

20 Claims, 11 Drawing Sheets

SINGLE LAYER TOUCH SENSOR WITH IMPROVED SENSITIVITY AND ACCURACY

FIELD OF TECHNOLOGY

Embodiments of the present invention relate to the field of electronics. More particularly, embodiments of the present invention relate to a user interface device.

BACKGROUND

A touch screen or touch pad is generally based on a two layer solution or single layer solution. With the two layer solution, rows and columns of conductive cells are interconnected. Thus, when a user touches the screen, a capacitor bridging a row and a column affected by the touch is formed. Accordingly, the two layer solution is called a bridging capacitor screen, mutual capacitor screen or projected capacitance screen. To make the arrays of rows and columns to work, the two layers need to be perfectly aligned during the manufacturing, which is a complex task. In addition, large numbers of connections need to be made as well, thus adding to extra manufacturing cost.

In the single layer solution called a surface capacitance screen, a continuous sheet of conductive material is deposited on glass or film. The sheet is used as a resistor. There are also electrodes at the four corners of the screen. Thus, when a user touches one spot of the screen, the screen acts as a two dimensional resistive divider. When electrical charges are accumulated in or removed from a capacitor formed between the spot and the user's finger, the current will flow to each electrode proportional to the distance of the user's finger from the electrode of the panel.

To calculate the horizontal position of the surface capacitance of the screen, the top and bottom electrodes of one side and the top and bottom electrodes of the opposite side are bridged, turning the screen into a resistor in one direction. Then, the capacitor formed between the user's finger and the position on the panel is charged up. As the capacitor is discharged, currents flowing through two different resistors formed when the screen is divided by the capacitor are measured. The two currents are subtracted and divided by the sum of them to make the value insensitive to the capacitance. The ratio would provide the x-coordinate of the position of the user's finger on the screen. The y-coordinate of the finger may be obtained by repeating the same process with the left and right electrodes of the top side and the left and right electrodes of the bottom side are bridged.

However, the surface capacitance of the panel is inherently non-linear. Since the voltage source is only connected to electrodes present at the corners, the amount of voltage applied to the top and bottom or the left and right across the screen may not be even. To compensate for the voltage drop across the screen, the electrodes are formed according to a linearization pattern. In the pattern, the distance between the electrodes facing each other across the screen becomes shorter as the electrodes are closer to the center of the screen, whereas the distance becomes longer as the electrodes are closer to the edge of the screen. That is, the voltage drop is compensated by lowering the resistance between the electrodes. However, the pattern consumes extra space and the sensitivity of the screen suffers as the resistance toward the center of the screen is lowered. Therefore, in this design as the linearity is increased, the sensitivity is decreased because the resistance is lowered. Furthermore, the surface capacitance of the screen is limited to determining the position of a single touch.

SUMMARY

Accordingly, what is needed is a method, device or system that offers the benefits of the one and two layer solutions while avoiding their shortcomings. For instance, the single layer solution is generally cheaper and easy to produce while the two layer solution is more accurate. Also, the two layer solution is more linear and sensitive. Embodiments of the present invention realize these advantageous functionalities. Embodiments include a readily manufacturable, low cost, very linear single touch pad or touch screen with single axis multi-touch capability.

One embodiment of the present invention pertains to a touch sensing system comprising a sensing device for sensing one or more touches on a sensor surface made of multiple conductive strips in one direction and a dual processing device for determining a horizontal position and a vertical position of each touch by processing currents generated in response to the touch, where the currents charge and discharge a capacitor formed between the touch (e.g., finger, etc.) and the sensor surface.

Another embodiment of the present invention pertains to a touch sensing device comprising a sensor surface for sensing one or more touches applied on the sensor surface made of multiple conductive strips in one direction, where the touches form a respective number of capacitors between the touches and the sensor surface, and a processor coupled to the sensor surface for determining the position of the touches by processing currents discharged by the respective number of capacitors.

Yet another embodiment of the present invention pertains to a touch sensor method comprising charging and discharging a capacitor formed between a touch and a sensor surface made of multiple conductive strips in one direction, measuring currents generated in response to the touch, determining a first direction of the touch based on a difference of the currents and determining a second direction of the touch based on a sum of the currents.

As illustrated in the detailed description, other embodiments also pertain to methods, devices and systems that provide a novel way to improve a touch sensor device, and in particular, increasing the linearity and sensitivity of the device while reducing the cost and complexity of manufacturing. Through utilizing a sensor surface made of multiple strips in one direction and a novel method and mechanism of locating a touch on the sensor surface, the embodiments provide a more robust, dependable and inexpensive touch sensor device.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the claims. Furthermore, in the detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Figure 1:
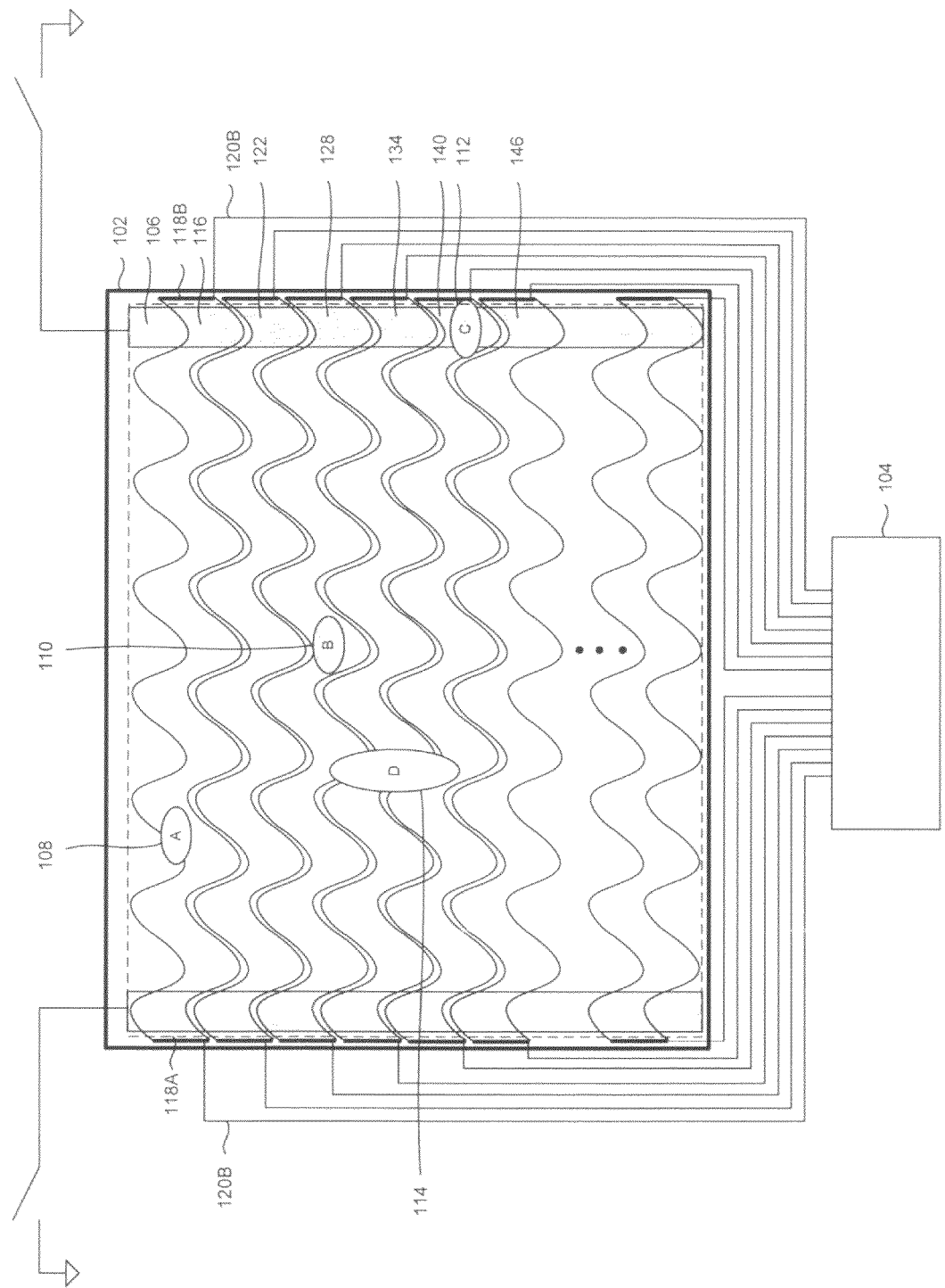
FIG. 1 is a schematic diagram of an exemplary touch sensor system, according to one embodiment.

FIG. 1 is a schematic diagram of an exemplary touch sensor system, according to one embodiment. In FIG. 1, a touch sensor system includes a sensing device 102 for sensing one or more touches on a sensor surface 106 made of multiple conductive strips in one direction. The touch sensing system also includes a processing device 104 for determining a horizontal position and a vertical position of each touch by processing currents generated in response to the touch, where the currents charge and discharge a capacitor formed between the touch and the sensor surface 106. The sensing device 102 and the processing device 104 are connected by one or more wires.

Each of the conductive strips includes at least one electrode at each end of the strip. As illustrated in FIG. 1, a conductive strip 116 is electrically connected to the processing device 104 through an electrode 118A on the left and through an electrode 118B on the right. The height or width of each conductive strip may be large enough such that an adult's finger (e.g., an index finger) can fit in, as illustrated in an exemplary touch A 108 (e.g., which is on the conductive strip 116), an exemplary touch B 110 (e.g., which is on a conductive strip 128) and an exemplary touch C 112 (e.g., which is on a conductive strip 140). Alternatively, the width of each conductive strip (e.g., three to five millimeters) is less than the diameter of a finger such that the touch crosses several conductive strips, as illustrated in an exemplary touch D 114 (e.g., which in across conductive strips 128, 134 and 140). The conductive strips may be straight or wavy. The wave pattern may allow the user to touch across several strips, thus enabling more accurate measurement of the finger position on the sensor surface 106. In addition, the conductive strips may be based on any conductive material, such as, for example an indium tin oxide (ITO) or polyethylene dioxythiophene (PDOT).

In another embodiment, a touch sensing device includes the sensor surface 106 for sensing one or more touches applied on the sensor surface 106 made of multiple conductive strips in one direction, where the touches form respective number of capacitors between the touches and the sensor surface. The device also includes a processor (e.g., a programmable system on chip (PSOC) or a field programmable gate array (FPGA)) coupled to the sensor surface 106 for locating the touches by processing currents discharged by the capacitors. In one example embodiment, higher resolution may be possible in the sensor surface based on multiple conductive strips since the entire signal in response to a touch passes through only active strips compared to the conventional surface capacitance panel where the signal flows through the entire screen.

Figure 2A:
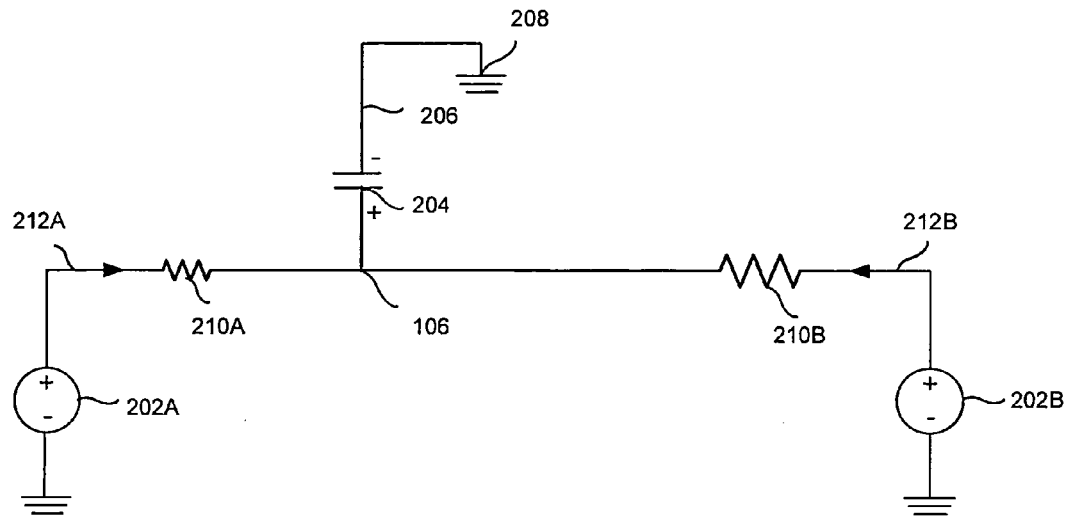
FIGS. 2A and 2B are simplified circuit diagrams of the exemplary touch sensor system of FIG. 1, according to one embodiment.
Figure 2B:
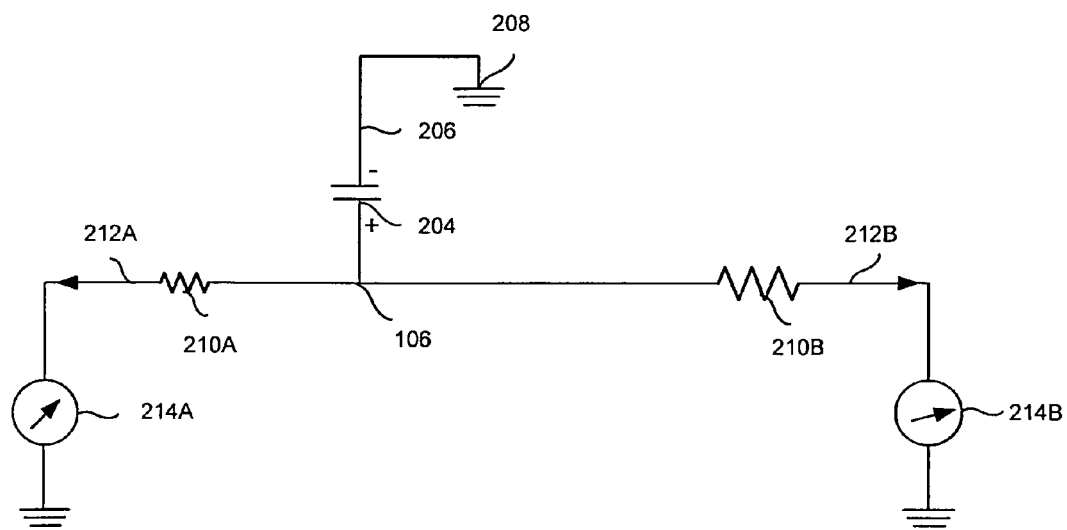

FIGS. 2A and 2B are simplified circuit diagrams of the exemplary touch sensor system of FIG. 1, according to one embodiment in response to an exemplary touch. In one example embodiment, the multiple conductive strips in the sensor surface 106 of FIG. 1 are in one direction—horizontal or vertical direction. In addition, the multiple conductive strips are adjacent to each other, and each strip is separated by its neighbor by an insulated material or gap. In FIG. 2A, one or more current sources (e.g., a current source 202A and a current source 202B) may charge a capacitor 204 formed between a touching object 206 (e.g., a finger, a stylus, etc.) and the sensor surface 106.

The conductive strip or strips disposed nearby where the capacitor 204 is formed may be represented as the circuit illustrated in FIG. 2A. For example, if the touch A 108 is applied on the sensor surface 106, the user's finger becomes one plate of the capacitor 204 dividing a length of conductive strip or strips into a resistor 210A and a resistor 210B. The resistor 210A is smaller than the resistor 210B since the touch A 108 is toward the left side of the sensor surface 106. The touch position is determined by charging the capacitor 204 first, discharging it and then measuring the current through each resistor. During the charging, the currents go through the resistors and the capacitor 204, and charge up the capacitor 204 in typically less than one micro second. Accordingly, a current 212A flowing through the resistor 210A is larger than a current 212B flowing through the resistor 210B. The currents flow due to voltage sources 202A and 202B applied to the conductive strip as shown.

FIG. 2B illustrates the capacitor 204 discharging the currents being measured. The currents flow out from the capacitor 204 (e.g., of ½ picofarad or 1 picofarad) when the voltage sources 202 are replaced with current sensors 214 coupled to the ground. The switching may take place periodically, pseudo-randomly or if the voltage formed on the capacitor 204 surpasses a reference voltage. In either case, the voltage begins to discharge from the capacitor 204, thus causing the currents to flow through the current measuring device 214A and the current measuring device 214B. Based on the currents measured by the current measuring devices (e.g., which operates at 6 MHz), the position of the touching object may be determined as will be illustrated in more detail in FIGS. 3A through 7B.

In one example embodiment, the currents present on a strip (e.g., the current 212A and the current 212B) are measured simultaneously. In this case, the noise common to both measurements may be cancelled out from the measurements. Alternatively, all the currents present on the sensor surface 106 may be measured simultaneously or sequentially with a single measurement system.

In another example embodiment, a PSOC may be used as the current source and current measuring device. The PSOC may rapidly switch between the current source and the current measuring device. And this is sequentially repeated across each strip. For instance, a conductive strip in the sensor surface 106 is selected, and the currents present on the conductive strip are measured over period of time to get sufficient accuracy. Then, next strip may be scanned and the whole process would repeat. As will be illustrated in more detail in FIG. 8, inside the PSOC, there is programmable routing resources, connecting first to a power supply and then to a current meter.

Figure 3A:
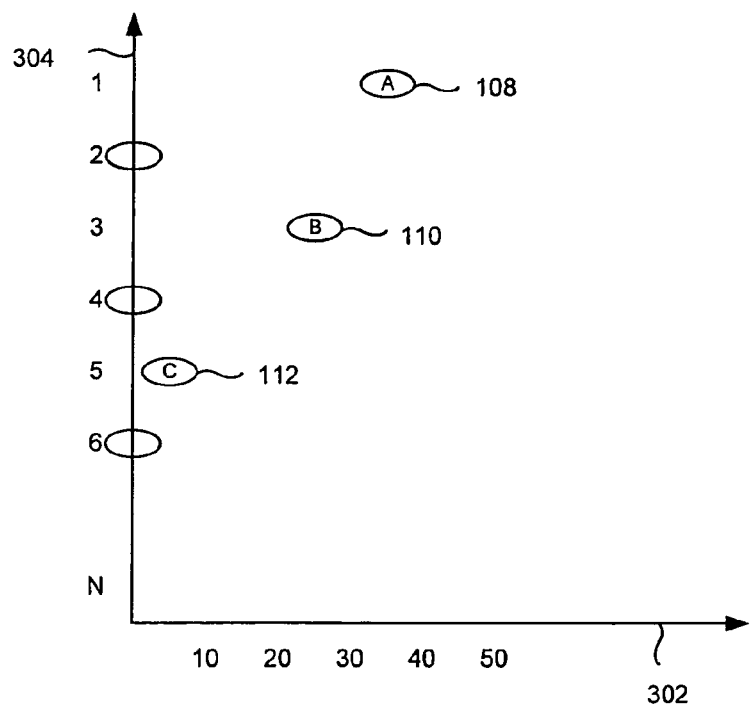
FIGS. 3A and 3B are graphical views of currents generated in response to touches applied within individual strips, according to one embodiment.
Figure 3B:
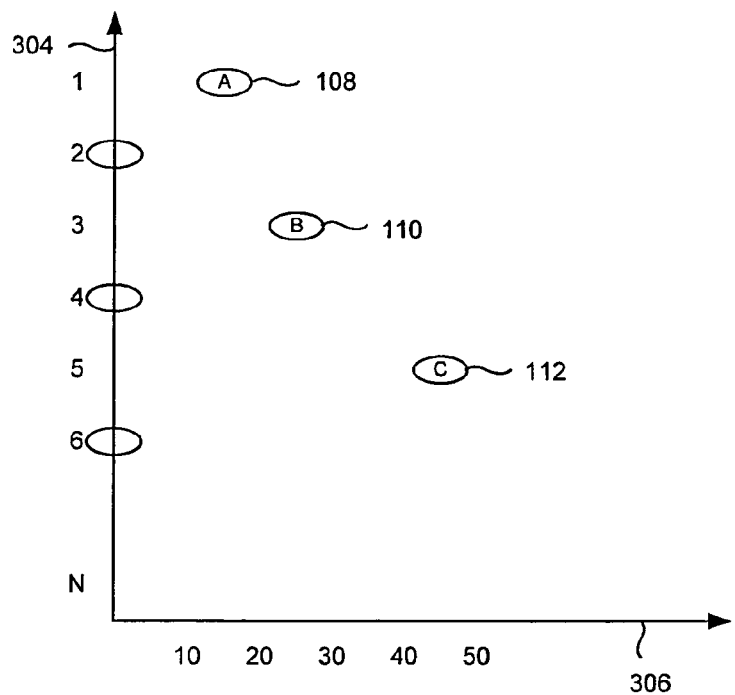

FIGS. 3A and 3B are graphical views of currents generated in response to exemplary touches applied within individual strips, according to one embodiment. The touches include the touch A 108, the touch B 110 and the touch C 112. The touches may be confined to a single strip when the touches are made using a stylus or the width of individual strips is greater than the size of a human finger.

FIGS. 3A and 3B illustrate the currents measured by a current measuring device coupled to electrodes on the left side of the sensor surface 106 and a current measuring device on the right side of the sensor surface 106, respectively. Since the exemplary touch A 108 is close to the left side of the sensor surface 106, the resistance formed between the electrode 118A and the touch A 108 is smaller than the resistance formed between the electrode 118B and the touch A 108. Thus, more current would be detected by the current measuring device on the left than the one on the right.

It is appreciated that throughout FIGS. 3A to 10B, ratios of the currents detected by the two current measuring devices in each strip, called current coefficients, are used in the location determination process instead of current measurements. For instance, the current coefficients may be obtained by subtracting baseline currents with no touch from the measured currents. Thus, the x-coordinate 302 of FIG. 3A represents current coefficients based on currents measured by the current measuring device 202A, whereas the x-coordinate 306 of FIG. 3B represents current coefficients based on currents measured by the current measuring device 202B. It is also appreciated that the y-coordinate 304 represents the number of conductive strips. Thus, the current coefficients of the touch A 108 are 35 and 15, the touch B 110 25 and 25 and the touch C 112 5 and 45.

Figure 4A:
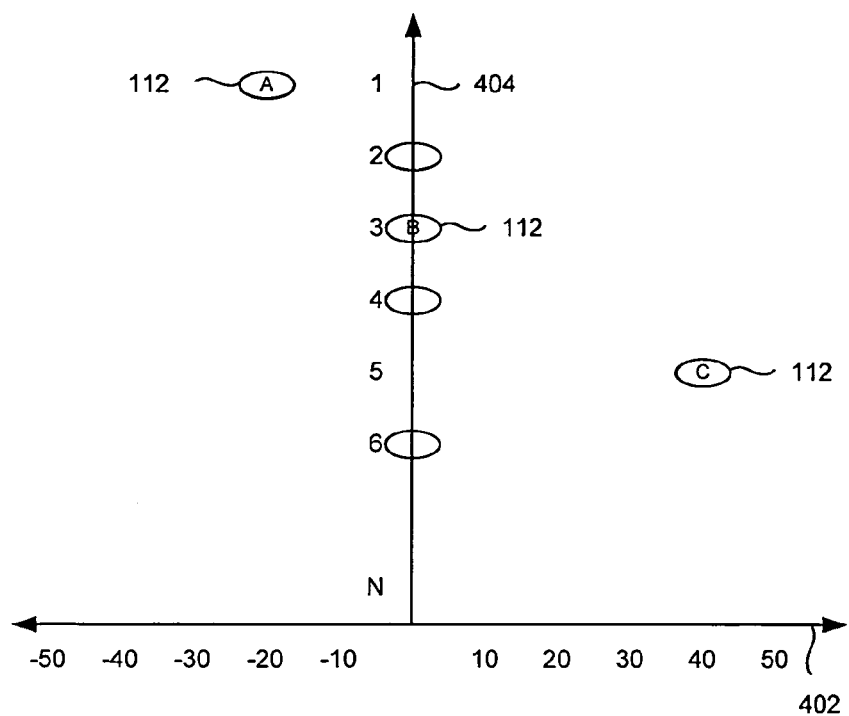
FIGS. 4A and 4B are graphical views illustrating the locations of the touches in FIGS. 3A and 3B, according to one embodiment.
Figure 4B:
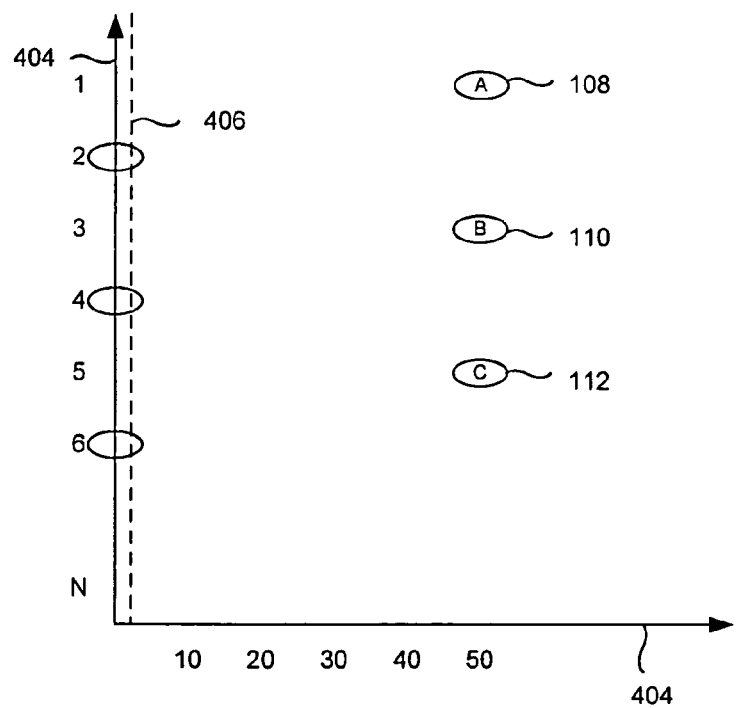

FIGS. 4A and 4B are graphical views illustrating the locations of the touches of FIG. 1, according to one embodiment. It is appreciated that the x-coordinates 402, 406 of the figures are calculated or derived from current coefficients, whereas the y-coordinate 404 represents the number of conductive strips. Based on the current coefficients obtained for the touches, x and y position coordinates of the touches may be determined. The horizontal position or the x-coordinate of the touch is obtained based on the difference between the two current coefficients as illustrated in FIG. 4A. For instance, the horizontal position of the touch A is obtained by subtracting 35 from 15 (e.g., which gives −20), the horizontal position of the touch B by subtracting 25 from 25 (e.g., which gives 0) and the horizontal position of the touch C by subtracting 45 from 5 (e.g., which gives 40). The values are proportional to the positions of the touches on the sensor surface 106.

In one example embodiment, the x-coordinate of the touch may be obtained based on the formula, x=scale factor*(right current−left current)/(right current+left current)+offset, where the right current is the current measured by a current measuring device coupled to the right side of the associated conductive strip and the left current is the current measured by a current measuring device connected to the left side of the associated conductive strip. The scale factor and offset may be used to give x-coordinate of the touch any desired range of values for various touch locations.

The vertical position or the y-coordinate of the touch may be obtained based on the sum of the two current coefficients as illustrated in FIG. 4B. The vertical position of the touch A is obtained by summing 35 and 15, the touch B by summing 25 and 25 and the touch C by summing 5 and 45. In one example embodiment, the vertical position of a touch to the sensor surface 106 may be obtained when the sum or another combination of two currents associated with the touch is greater than a threshold value.

Thus, in FIG. 4B, the touch A 108, the touch B 110 and the touch C 112 are recognized as such since the coefficient values representing their vertical positions are greater than the threshold value (e.g., 20). Thus, in FIG. 4B, the vertical positions of the touch A 108, the touch B 110 and the touch C 112 can be deduced to be on conductive strips 1, 3 and 5, respectively. The vertical position obtained in this manner may be valid when the touching object is a stylus, the width of individual conductive strips is greater than the size of the user's finger or the finger does not touch across the conductive strips.

Figure 5:
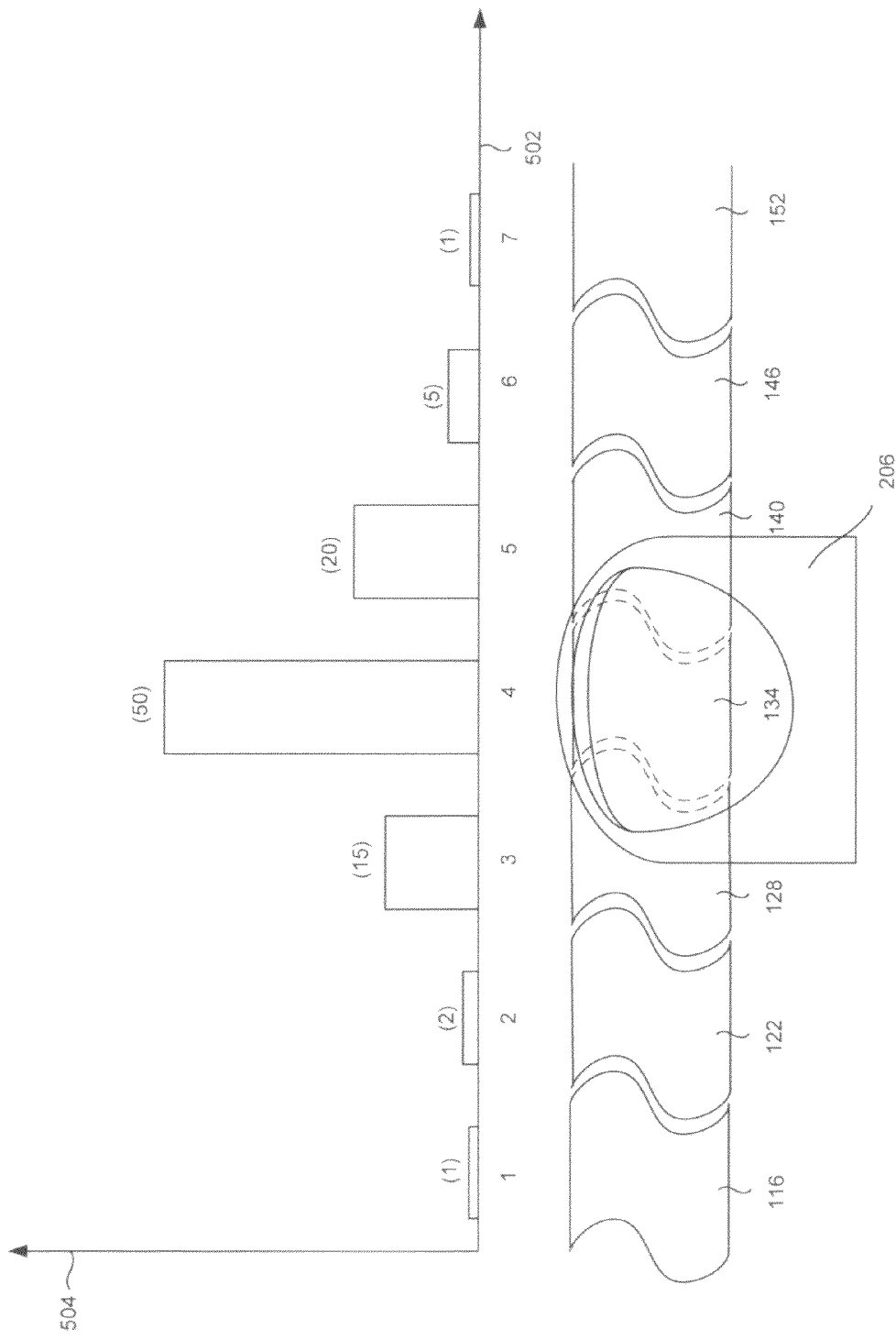
FIG. 5 is a graphical view of an exemplary touch crossing several adjacent strips of the exemplary touch sensor system of FIG. 1, according to one embodiment.

FIG. 5 is a graphical view of a touch crossing several adjacent strips of the exemplary touch sensor system of FIG. 1, according to one embodiment. It is appreciated that the x-coordinate 502 of the figure represents the number of conductive strips, whereas the y-coordinate 504 represents current coefficients. If individual strips of the sensor surface 106 are narrow enough such that a user's finger touches across several strips, the vertical position or y-coordinate of the touch may be located more accurately by obtaining the centroid of the touch induced current measurements spread across the strips.

In FIG. 5, a touching object 206 is touching across the conductive strip 128, the conductive strip 134 and the conductive strip 140. Accordingly, the largest amount of current is generated on the conductive strip 134 (e.g., the fourth conductive strip), and a less amount of current is generated on a conductive strip neighboring the conductive strip 134. As a conductive strip is located farther away from the touch position on the fourth conductive strip, less current is produced in response to the touch. Thus, the sum of current coefficients for the fourth conductive strip is 50, the sum of current coefficients for the third conductive strip is 15, the sum of current coefficients for the fifth conductive strip is 20, the sum of current coefficients for the second conductive strip is 2, the sum of current coefficients for the fifth conductive strip is 5, the sum of current coefficients for the first conductive strip is 1 and the sum of current coefficients for the second conductive strip is 1. Position information may be obtained using the centroid of these coefficients.

Figure 6A:
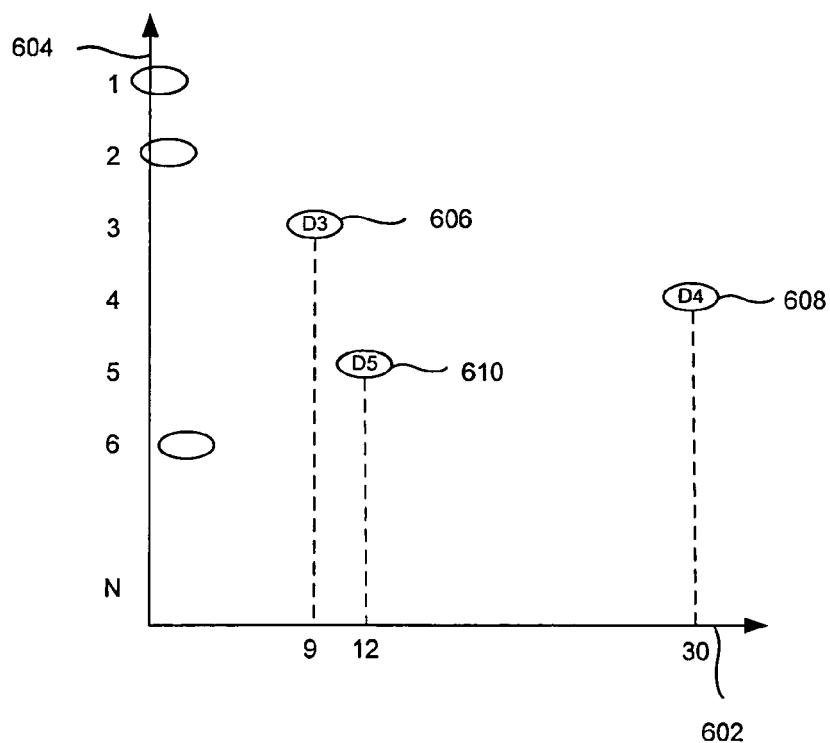
FIGS. 6A and 6B are graphical views of currents generated in response to an exemplary touch applied across several strips of the exemplary touch sensor system of FIG. 1, according to one embodiment.
Figure 6B:
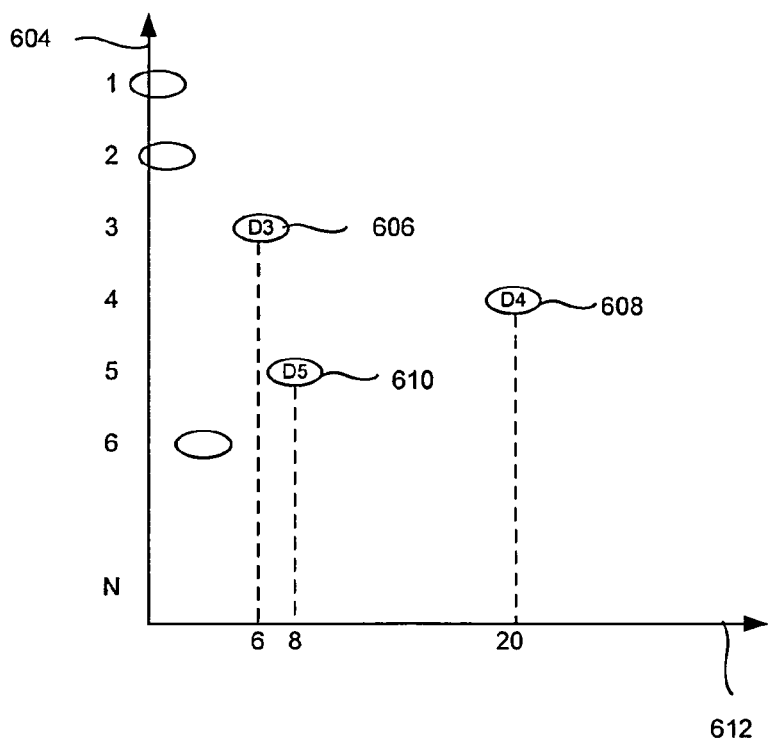

FIGS. 6A and 6B are graphical views of currents generated in response to a touch applied across several strips of the exemplary touch sensor system of FIG. 1, according to one embodiment. It is appreciated that the x-coordinate 602 of FIG. 6A represents current coefficients based on currents measured by the current measuring device 202A, whereas the x-coordinate 612 of FIG. 6B represents current coefficients based on currents measured by the current measuring device 202B. It is also appreciated that the y-coordinate 604 represents the number of conductive strips. As illustrated in FIGS. 6A and 6B, the touch D 114 may be detected on the third conductive strip (e.g., D3 606), the fourth conductive strip (e.g., D4 608) and the fifth conductive strip (e.g., D5 610). It is appreciated that the smaller currents detected by other conductive strips that are further way from the touch point may be ignored if the currents are less than a threshold value (e.g., 1).

Accordingly, the current coefficients of the exemplary touch D 114 associated with currents measured by the current measuring device 202A are 9 for the exemplary touch D3 606, 30 for the exemplary touch D4 608 and 12 for the exemplary touch D5 610. The current coefficients of the exemplary touch D 114 associated with currents measured by the current measuring device 202B are 6 for the exemplary touch D3 606, for the exemplary touch D4 608 and 8 for the exemplary touch D5 610.

Figure 7A:
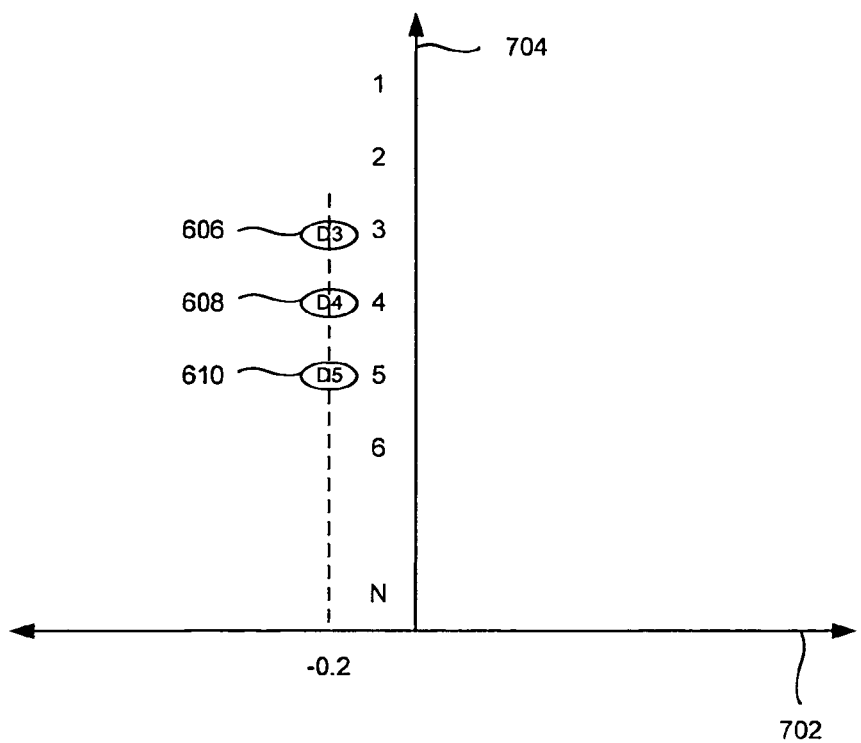
FIGS. 7A and 7B are graphical views illustrating the locations of the exemplary touch of FIGS. 6A and 6B, according to one embodiment.
Figure 7B:
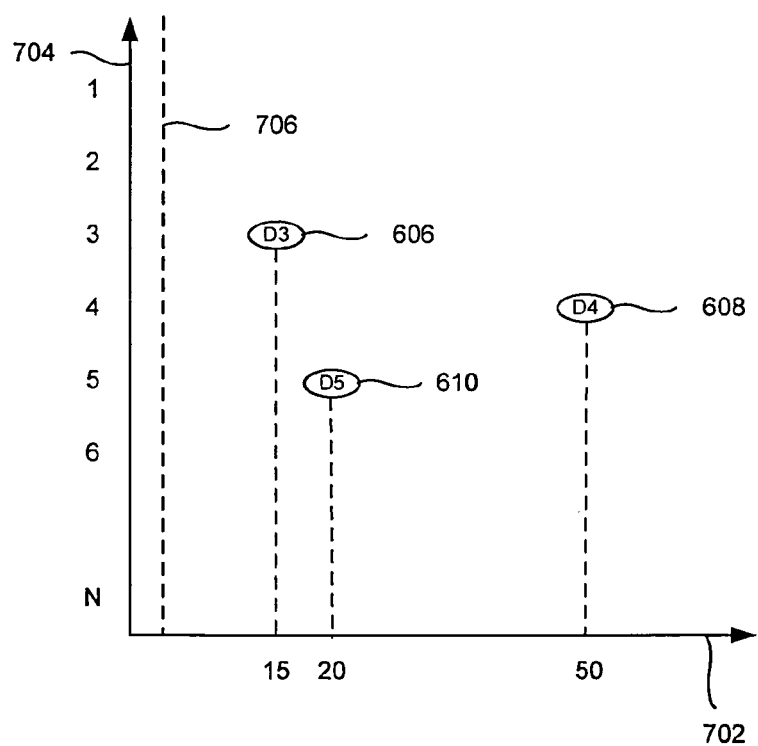

FIGS. 7A and 7B are graphical views illustrating the locations of the touch of FIGS. 6A and 6B, according to one embodiment. It is appreciated that the x-coordinate 702 of the figures represents current coefficients, whereas the y-coordinate 704 represents the number of conductive strips. Based on the current coefficients obtained for the touch D 114, x and y coordinates of the touch may be determined. The horizontal position or the x-coordinate of the touch is obtained based on the difference between the two current coefficients as illustrated in FIG. 7A. For instance, the horizontal position of the touch D3 606 is obtained by subtracting 9 from 6 and dividing by the sum of 9 and 6 (e.g., which gives −0.2) the horizontal position of the touch D4 608 by subtracting 30 from 20 and dividing by the sum of 30 and 20 (e.g., which gives −0.2) and the horizontal position of the touch D5 610 by subtracting 12 from 8 and dividing by the sum of 12 and 8 (e.g., which gives −0.2). Thus, the unsealed x-coordinate of the touch D 114 is deduced as −0.2 where 0 is the x-coordinate of the panel center.

Moreover, the formula, x=scale factor*(right current−left current)/(right current+left current)+offset may be also used to approximate the position of the touch D 114. The scale factor and offset may be used to make x have any desired range of values for various touch locations.

The vertical position or the y-coordinate of the touch D 114 may be obtained by calculating the centroid of the vertical positions of the touch D3 606, the touch D4 608 and the touch D5 610. First, the vertical positions of the touch D3 606, the touch D4 608 and the touch D5 610 are obtained by summing their respective current coefficients. Accordingly, the sums of current coefficients associated with the touch D3 606, the touch D4 608 and the touch D5 610 are 15, 50, and 20, respectively.

In one example embodiment, the vertical position of the touch D 114 may be deduced either by calculating the centroid of the touch D3 606, the touch D4 608 and the touch D5 610. Alternatively, the vertical position of the touch D 114 may be determined by picking the strip which generates the highest sum of current coefficients in response to the touch D 114. It is appreciated that other numeric methods can be used to find the touch center including polynomial curve fitting with solutions for local maxima.

Figure 8:
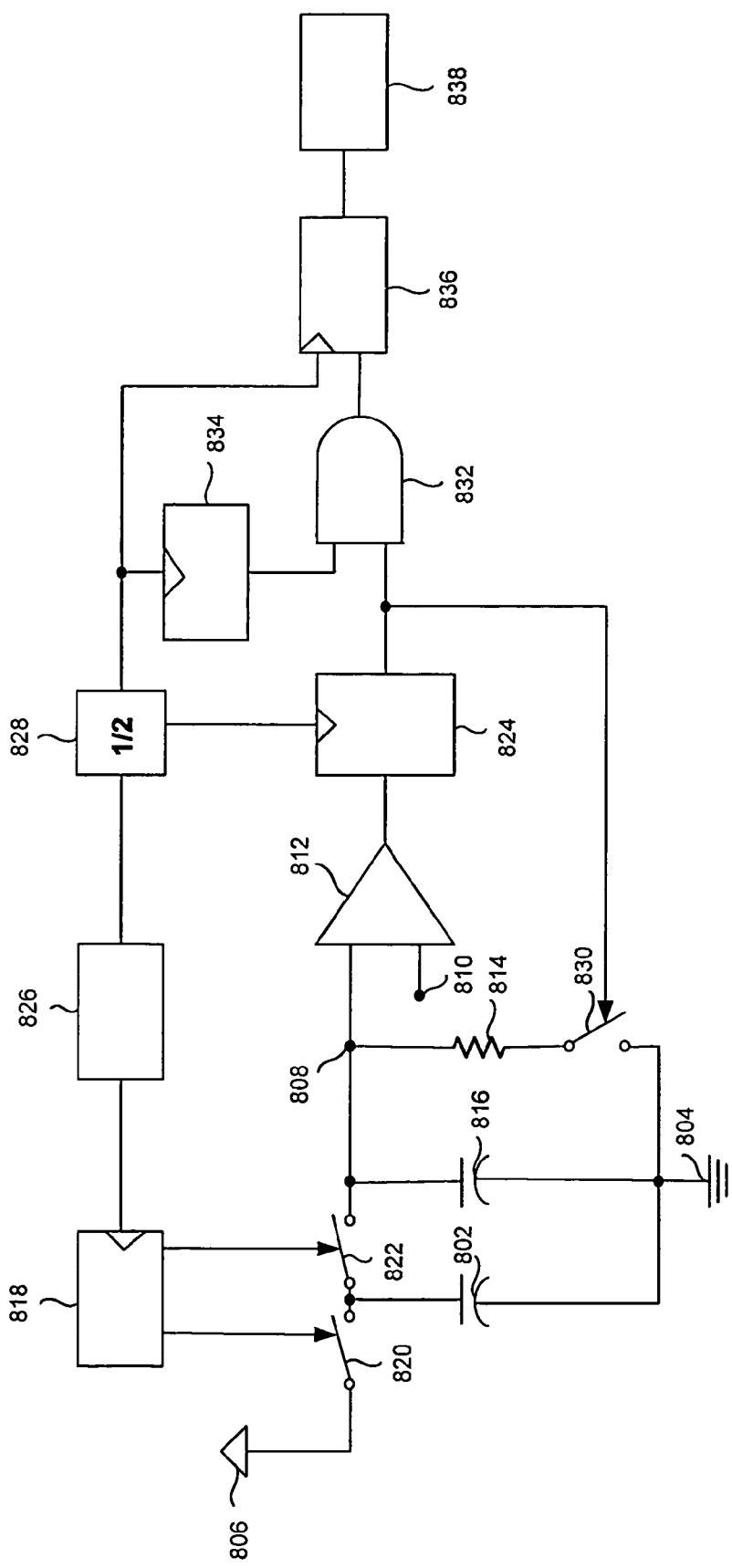
FIG. 8 is an exemplary current generating/measuring device of the exemplary touch sensor system of FIG. 1, according to one embodiment.

FIG. 8 is an exemplary current generating/measuring device of the touch sensor system of FIG. 1, according to one embodiment. The presence of a conductive object (e.g., a finger, a stylus, etc.) increases the capacitance of a sensor capacitor 802 (e.g., which is formed between the conductive object and the sensor surface 106 of FIG. 1). The sensor capacitor 802, with its one node tied to a ground 804, is charged and/or discharged by a voltage source or a current meter 806. The change in capacitance in the sensor capacitor 802 is then measured to detect the presence of the conductive object. For example, the change of capacitance may be measured in terms of a current charged or discharged on the sensor capacitor 802.

The circuit illustrated in FIG. 8 is a switched capacitor circuit which converts the capacitance charged or discharged on the sensor capacitor 802 into a capacitor voltage 808, which is compared to a reference voltage 810. When the capacitor voltage 808 reaches the reference voltage 810, a comparator 812 triggers a bleed resistor 814 discharging the sensor capacitor 802. After the capacitor voltage 808 discharges below the reference voltage 810, the bleed resistor 814 is left floating to allow the sensor capacitor 802 to continue charging.

The output of the comparator 812 becomes a bit-stream as it toggles the bleed resistor 814 and manipulates its input voltage. This bit stream is treated with a pulse width modulation to provide a consistent stream framing. The number of counts in each frame is analyzed to determine if the capacitive sensor 802 was activated.

The sensor capacitor 802 is coupled in parallel with a modulation capacitor 816. The sensor capacitor 802 and the modulation capacitor 816 are controlled by a 16-bit pseudo random sequencer 818 (e.g., or a fixed clock). The pseudo random sequencer 818 is used to attenuate emitted noise on the capacitor sensor 802 by reducing the amount of EMI created by a fixed frequency source, such as the fixed clock, and to increase EMI immunity from other sources and their harmonics.

The voltage on the modulation capacitor 816 is continually charged in small increments due to continuous operation of the sensor capacitor 802 and a first switch 820 and a second switch 822. It is appreciated that the two switches are never simultaneously closed. Thus, if the first switch 820 closes, it charges the sensor capacitor 802. If the first switch 820 opens, the charge on the sensor capacitor 802 is held until the second switch 822 closes, sharing charge from the sensor capacitor 802 with the modulation capacitor 816. Because the two switches are controlled by the pseudo random sequencer 818, the capacitor voltage 808 is in a non-uniform increment rather than a smooth increase.

When the capacitor voltage 808 reaches the reference voltage 810, the comparator 812 trips, but a latch 824 does not toggle until two clock cycles later. This is due to a latch 824 being clocked at half (e.g., using a frequency divider 828) the speed of an oscillator 826, which also clocks the pseudo random sequencer 818. It is appreciated that the latch 824 toggles two cycles after the comparator 812 trips since the second switch 822 and the checking of the latch 824 start on the same cycle. Therefore, the latch 824 waits two cycles before checking again after the comparator 812 trips. This allows for a known time between the tripping point and the latch toggle.

When the output of the latch 824 goes high, a third switch 830 is closed, connecting the bleed resistor 814 to the ground 804 which discharges the modulation capacitor 816. The modulation capacitor 816 is charged for several short moments during the discharge phase. This happens because the sensor capacitor 802 continues to operate and is dumping charge on the modulation capacitor 816 as it is being discharged. After the modulation capacitor 816 discharges beyond the reference voltage 810, the latch 824 does not toggle until after two clock cycles.

When the conductive object forms the sensor capacitor 802, the input resistance of the circuit illustrated in FIG. 8 decreases. This decreased resistance causes an increase in the current flowing through the sensor capacitor 802. To maintain the capacitor voltage 808 near the reference voltage 810, the third switch 830 connecting the bleed resistor 814 to the ground 804 is closed with a higher duty cycle.

The opening and closing of the latch 824 by the output of the comparator 812 creates a variable duty cycle bit stream used to determine the presence of the conductive object on the sensor surface (e.g., to a particular conductive strip or a group of conductive strips). The bit stream is first treated (e.g., using an AND gate 832) with a pulse-width modulation (e.g., using a pulse-width modulation module 834), which is clocked at the same frequency as the latch 824, to create measurement windows as shown in FIGS. 9 and 10. These measurement windows are fed directly into the enable input in a counter 836, which is also clocked at the same frequency as the latch 824. As each bit from a measurement goes into the enable input, the counter 836 records the number of clock cycles that occur during its length. Since the duty cycle of the bit stream increases with higher capacitance, more counts are measured when the conductive object is present. The counter 836 records the number of clock cycles for one measurement window at a time as the pulse-width modulation module 834 resets the counter 836 by setting an interrupt when transitioning from high to low.

The raw number of clock cycles from the counter 836 (e.g., which is proportional to the measure current) is processed by a data processing module 838 to determine a presence of any conductive object. The data processing module 838 may look at several measurement windows for the sensor capacitor 802 formed depending on user settings (e.g., to increase the accuracy of measurement).

Figure 9A:
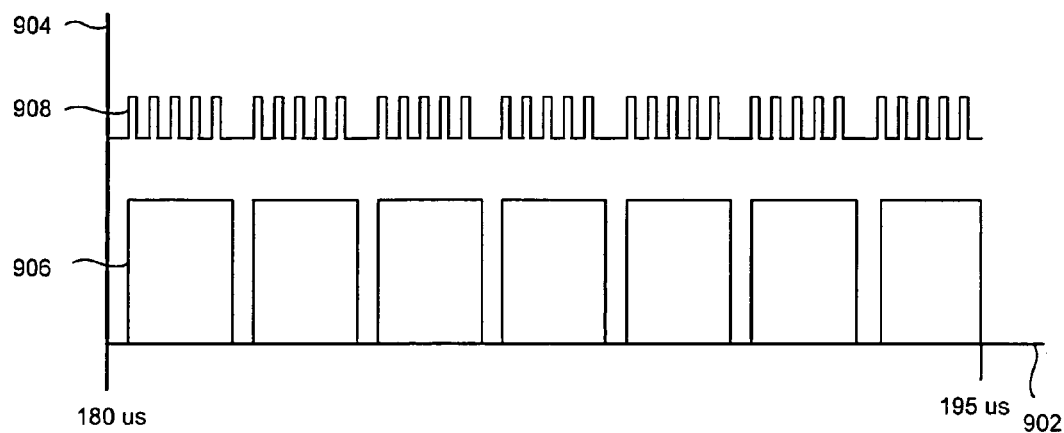
FIGS. 9A and 9B are illustrative views of currents generated in response to the exemplary touch A of FIG. 1 that are detected by the exemplary current generating/measuring device of FIG. 8, according to one embodiment.
Figure 9B:
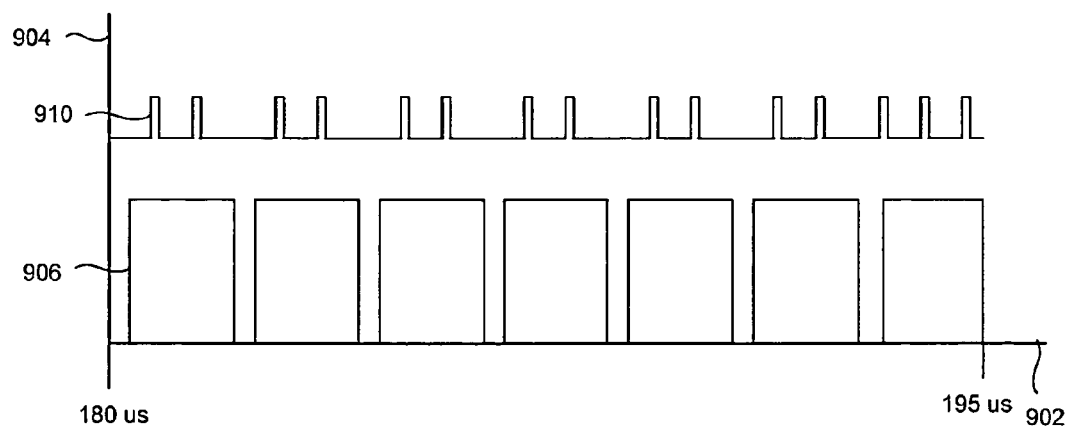

FIGS. 9A and 9B are illustrative views of the currents generated in response to the touch A 108 of FIG. 1 that are detected by the exemplary current generating/measuring device of FIG. 8, according to one embodiment. It is appreciated that the x-coordinate 902 of the figures represents time, whereas the y-coordinate 904 represents a signal. In FIG. 9A, the touch A 108 may generate a bitstream 908 when it is processed by the current measuring device 214A of FIG. 2B. In one example embodiment, the current measuring device 214A may be based on the exemplary current generating/measuring device of FIG. 8. The bitstream 908 may be obtained when the bitstream forwarded by the latch 836 is modulated using a pulse-width modulation signal 906. Then, the duty cycle of the bitstream 908 is counted for a given period. In FIG. 9A, the given period is 15 microseconds, and 35 bits are counted during the period.

In FIG. 9B, the touch A 108 may generate a bitstream 910 when it is processed by the current measuring device 214B of FIG. 2B. In one example embodiment, the current measuring device 214B may be based on the exemplary current generating/measuring device of FIG. 8. The bitstream 910 may be obtained when the bitstream forwarded by the latch 836 is modulated using the pulse-width modulation signal 906. 15 bits are counted during the period.

In one example embodiment, the data processing module 838 may be used to calculate the x and y coordinates of the touch A 108 based on the duty cycle obtained in FIGS. 9A and 9B. For example, the x-coordinate of the touch A is obtained based on the sum scaled difference (A−B)/(A+B) between the duty cycle measured for the bitstream 910 (e.g., which is 15) and the duty cycle for the bitstream 908 (e.g., which is 35). In addition, the y-coordinate of the touch A is obtained based on the sum of the duty cycle for the bitstream 908 and the duty cycle for the bitstream 910. It is appreciated that the positions of the touch B 110 and the touch C 112 may be obtained according to the method described herein.

Figure 10A:
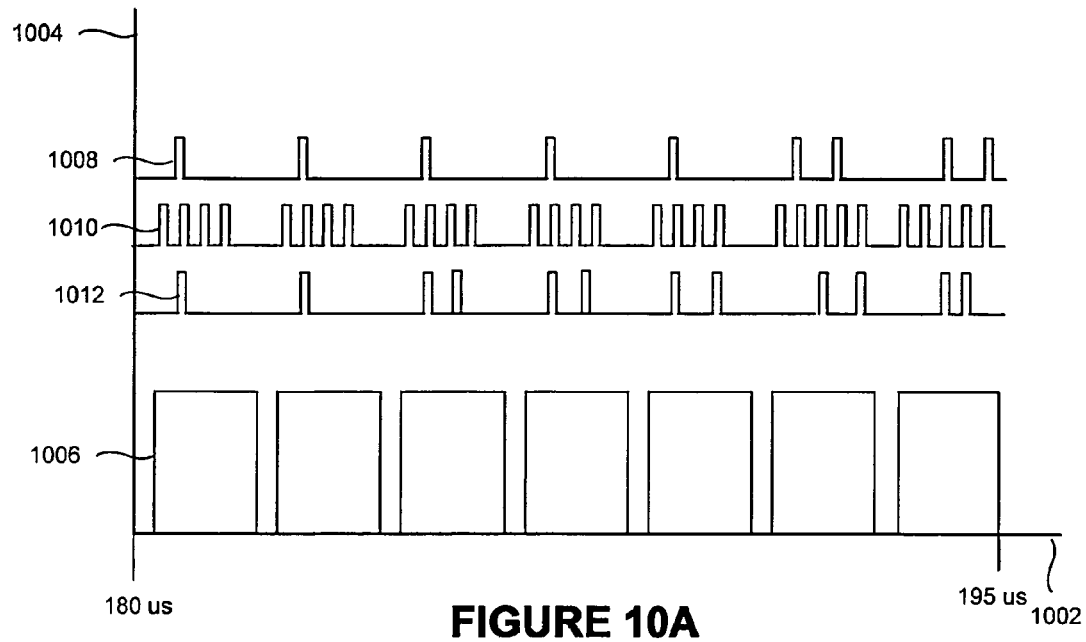
FIGS. 10A and 10B are illustrative views of currents generated in response to the exemplary touch D of FIG. 1 that are detected by the exemplary current generating/measuring device of FIG. 8, according to one embodiment.
Figure 10B:
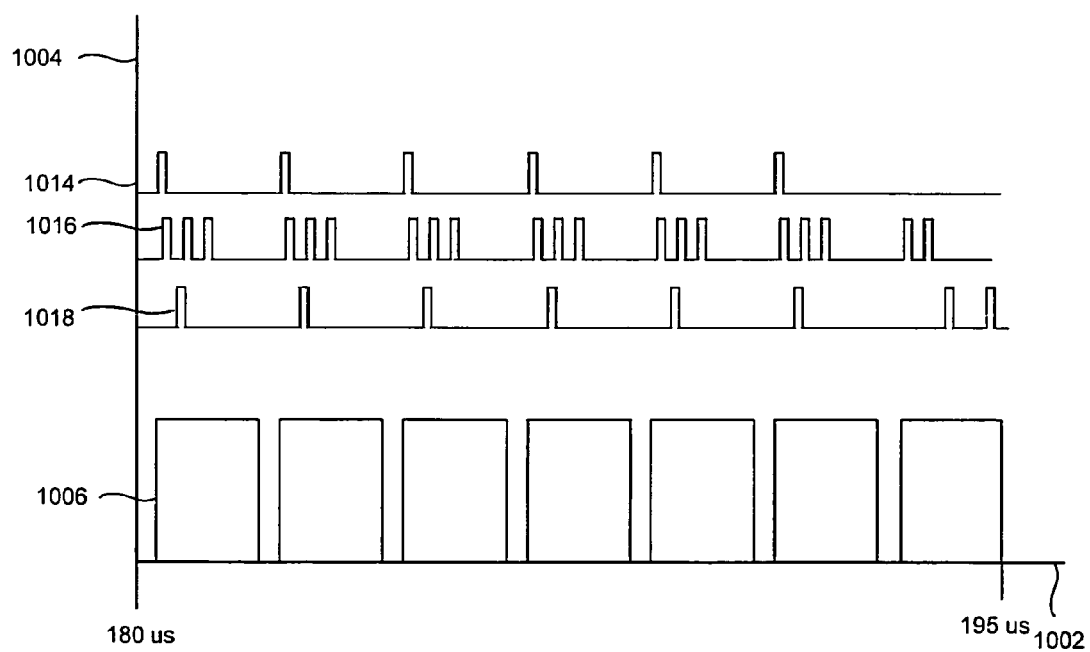

FIGS. 10A and 10B are illustrative views of the processed currents generated in response to the touch D 114 of FIG. 1 that are detected by the exemplary current generating/measuring device of FIG. 8, according to one embodiment. It is appreciated that the x-coordinate 1002 of the figures represents time, whereas the y-coordinate 1004 represents a signal. In FIG. 10A, the touch D 114, which is applied across three conductive strips as the touch D3 606, the touch D4 608 and the touch D5 610, may generate a bitstream 1008, a bitstream 1010 and a bitstream 1012 when it is processed by the current measuring device 214A of FIG. 2B. In one example embodiment, the current measuring device 214A may be based on the exemplary current generating/measuring device of FIG. 8. The bitstreams may be obtained when the bitstreams forwarded by the latch 836 are modulated using a pulse-width modulation signal 1006. Then, the number of the bits in each of the bitstreams is counted for a given period. In FIG. 10A, the given period is 15 microseconds, and 9, 30 and 12 bits are counted for the bitstreams 1008, 1010 and 1012, respectively for the period.

In FIG. 10B, the touch D 114, which is applied across three conductive strips as the touch D3 606, the touch D4 608 and the touch D5 610, may generate a bitstream 1014, a bitstream 1016 and a bitstream 1018 when it is processed by the current measuring device 214B of FIG. 2B. In one example embodiment, the current measuring device 214B may be based on the exemplary current generating/measuring device of FIG. 8. The bitstreams may be obtained when the bitstreams forwarded by the latch 836 are modulated using a pulse-width modulation signal 1006. Then, the number of the bits in each of the bitstreams is counted for a given period. In FIG. 10B, the given period is 15 microseconds, and 6, 20 and 8 bits are counted for the bitstreams 1014, 1016 and 1018, respectively for the period.

In one example embodiment, the data processing module 838 may be used to calculate the x and y coordinates of the touch D 114 based on the duty cycle obtained in FIGS. 10A and 10B. For example, the x-coordinate of the touch D 114 is obtained based on the difference between the duty cycle for the bitstream 1014 (e.g., which is 6) and the duty cycle for the bitstream 1008 (e.g., which is 9), between the duty cycle for the bitstream 1016 (e.g., which is 20) and the duty cycle for the bitstream 1010 (e.g., which is 30) or between the duty cycle for the bitstream 1018 (e.g., which is 8) and the duty cycle for the bitstream 1012 (e.g., which is 12).

In addition, the y-coordinate of the touch D 114 is obtained based on interpolating the sum of the duty cycle for the bitstream 1008 and the duty cycle for the bitstream 1014, the sum of the duty cycle for the bitstream 1010 and the duty cycle for the bitstream 1016 and the sum of the duty cycle for the bitstream 1012 and the duty cycle for the bitstream 1016.

Figure 11:
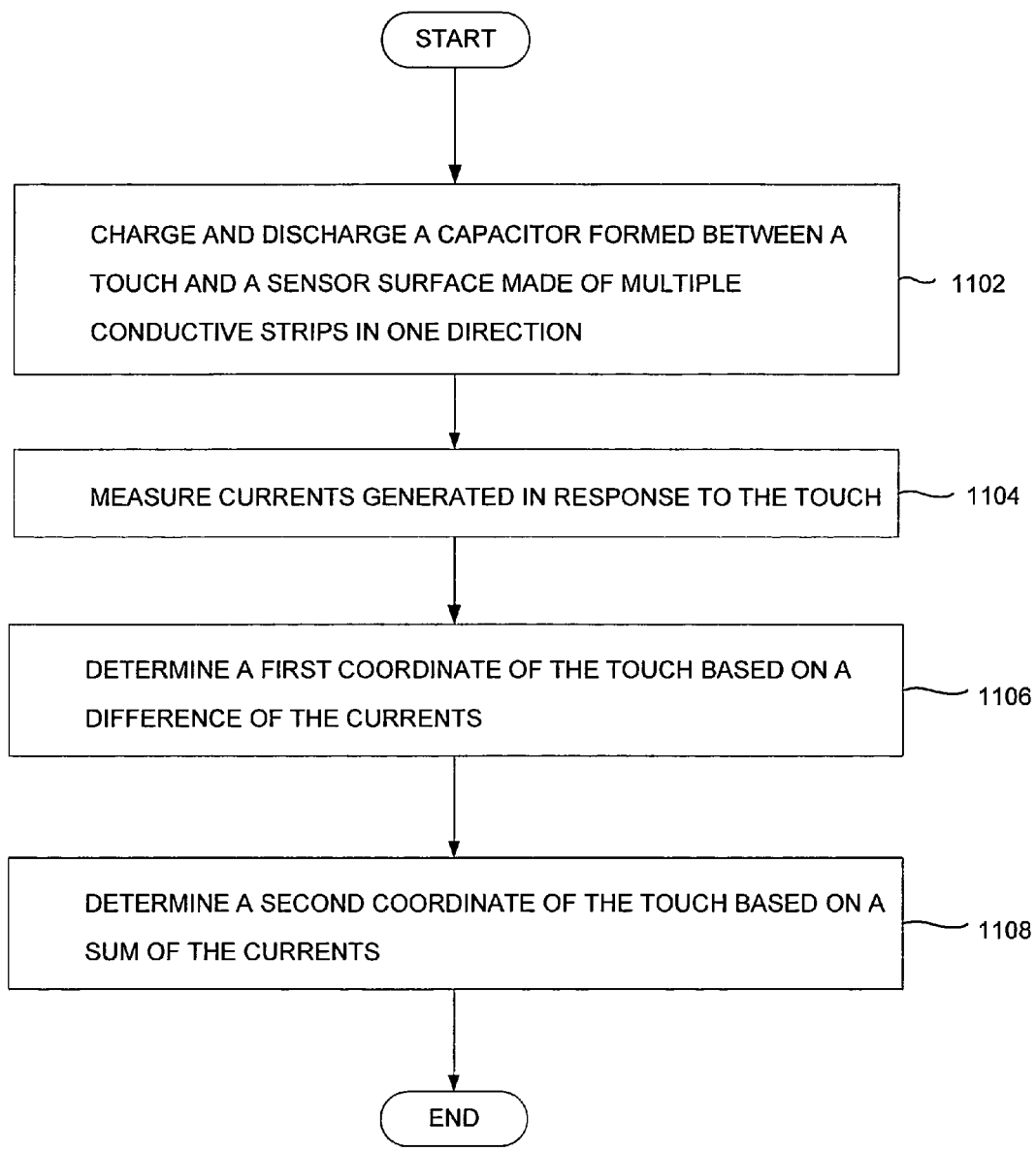
FIG. 11 is a flow chart of a process for locating the position of an exemplary touch applied on an exemplary touch sensor device made of multiple strips in one direction, according to one embodiment.

FIG. 11 is a flow chart of an exemplary process for locating the position of a touch applied on a touch sensor device made of multiple strips in one direction, according to one embodiment. In operation 902, a capacitor formed between a touch and a sensor surface made (e.g., coated) of multiple conductive strips in one direction is charged and discharged (e.g., using a current generating device). It is appreciated that multiple touches may be applied on the sensor surface at the same time. In operation 904, currents generated in response to the touch are measured (e.g., using a current measuring device). Measurement may be performed on the discharge or may be performed on the charge, or both. In operation 906, a first coordinate of the touch is determined based on a difference of the currents. In operation 908, a second coordinate of the touch is determined based on a sum of the currents.

In one example embodiment, two current generating and measuring devices coupled to each end of each conductive strip are used to charge and measure the currents generated in response to the touch. The currents may be converted to unitless current coefficients. Moreover, the touch may cross two or more conductive strips. In such a case, the second direction of the touch is obtained by interpolating respective sums of currents measured for the conductive strips.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A touch sensing system, comprising:
    a sensing device to sense at least one touch on a single layer sensor surface comprising a plurality of conductive strips disposed along one direction; and
    a processing device coupled to the sensing device to determine a horizontal position and a vertical position of the at least one touch by processing currents generated in response to the at least one touch, the currents simultaneously flowing in opposite directions away from the at least one touch through at least one of the plurality of conductive strips, wherein the processing device is configured to measure a first current through a first end of the at least one of the plurality of conductive strips and measure a second current through a second end of the at least one of the plurality of conductive strips, wherein the currents discharge a capacitor formed between the each one of the at least one touch and the single layer sensor surface.

2. The system of claim 1, wherein the one direction is one of a horizontal direction and a vertical direction.

3. The system of claim 2, wherein the horizontal position of the touch is obtained based on a difference between the currents provided the one direction that is the horizontal direction.

4. The system of claim 3, wherein the vertical position of the touch is obtained based on a sum of the currents.

5. The system of claim 4, wherein the touch is detected when the sum of the currents is greater than a threshold value.

6. The system of claim 1, wherein the processing of the currents is performed simultaneously for all of the currents.

7. The system of claim 1, wherein each of the plurality of conductive strips comprise two electrodes connected at both ends to current measurement circuits.

8. The system of claim 7, wherein the each of the plurality of conductive strips is less than a size of a finger in width and separated in distance such that the touch crosses several adjacent ones of the plurality of the conductive strips.

9. The system of claim 8, wherein the each of the plurality of conductive strips is three to five millimeters in width.

10. The system of claim 1, wherein the plurality of conductive strips is one of straight and wavy.

11. The system of claim 1, wherein the plurality of conductive strips is based on an indium tin oxide (ITO) or a polyethylene dioxythiophene (pdot).

12. A touch sensing device, comprising:
    a single layer sensor surface to sense at least one touch applied on the single layer sensor surface, wherein the single layer sensor surface comprises a plurality of conductive strips disposed along one direction;
    wherein the at least one touch forms a respective number of capacitors between the at least one touch and the single layer sensor surface; and
    a processor coupled to the single layer sensor surface to locate the at least one touch by processing currents discharged by the respective number of capacitors, the currents simultaneously flowing in opposite directions away from the at least one touch through at least one of the plurality of conductive strips, wherein the processor is configured to measure a first current through a first end of the at least one of the plurality of conductive strips and measure a second current through a second end of the at least one of the plurality of conductive strips.

13. The device of claim 12, wherein the processor comprises a programmable system on chip (PSOC).

14. The device of claim 12, wherein the processor comprises current measurement circuitry coupled to both ends of each conductive strip.

15. A method for detecting a touch on a sensor, comprising:
    charging and discharging a capacitor formed between the touch and a sensor surface of the sensor, wherein the sensor comprises a plurality of conductive strips disposed along one direction;
    measuring currents generated in response to the touch, the currents simultaneously flowing in opposite directions away from the touch through at least one of the plurality of conductive strips, wherein the measuring of the currents includes measuring a first current through a first end of the at least one of the plurality of conductive strips and measuring a second current through a second end of the at least one of the plurality of conductive strips;
    determining a first coordinate of the touch based on a difference of the currents; and
    determining a second coordinate of the touch based on a sum of the currents.

16. The method of claim 15, wherein the charging is performed using a voltage source and the measuring is performed using a current measuring device.

17. The method of claim 15, wherein the charging and the measuring are performed using two voltage sources and two current measuring devices each coupled to a respective one of the plurality of conductive strips.

18. The method of claim 15, wherein the measuring the currents further comprises converting the currents into unitless current coefficients.

19. The method of claim 15, wherein the touch involved at least two adjacent ones of the plurality conductive strips.

20. The method of claim 19, wherein the determining the second coordinate of the touch comprises interpolating respective sums of currents measured for the at least two adjacent ones of the plurality of conductive strips.

* * * * *